(12) United States Patent
Shin et al.

(10) Patent No.: US 12,515,665 B2
(45) Date of Patent: Jan. 6, 2026

(54) METHOD AND APPARATUS FOR BACKWARD DRIVING ASSIST OF VEHICLE

(71) Applicant: HYUNDAI MOBIS CO., LTD., Seoul (KR)

(72) Inventors: Kyung Sik Shin, Suwon-si (KR); Ji Hyun Chae, Seoul (KR); Seung Hyun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 105 days.

(21) Appl. No.: 18/451,731

(22) Filed: Aug. 17, 2023

(65) Prior Publication Data
US 2024/0075931 A1    Mar. 7, 2024

(30) Foreign Application Priority Data
Sep. 1, 2022 (KR) .................. 10-2022-0110990

(51) Int. Cl.
*B60W 30/18* (2012.01)
*G06T 7/70* (2017.01)

(52) U.S. Cl.
CPC ......... *B60W 30/18036* (2013.01); *G06T 7/70* (2017.01); *B60W 2420/403* (2013.01); *B60W 2420/408* (2024.01); *B60W 2554/4044* (2020.02); *B60W 2556/50* (2020.02); *G06T 2207/30242* (2013.01); *G06T 2207/30252* (2013.01)

(58) Field of Classification Search
CPC ..... B60W 30/18036; B60W 2420/403; B60W 2420/408; B60W 2554/4044; G06T 7/70
See application file for complete search history.

(56) References Cited

U.S. PATENT DOCUMENTS

| | | | |
|---|---|---|---|
| 2017/0158236 A1* | 6/2017 | Kim | B62D 6/10 |
| 2018/0266830 A1 | 9/2018 | Kato et al. | |
| 2019/0130752 A1* | 5/2019 | Takaki | B60T 7/12 |
| 2019/0197323 A1* | 6/2019 | Sakai | G06V 10/764 |
| 2020/0180691 A1 | 6/2020 | Sandblom | |
| 2022/0185324 A1* | 6/2022 | Lee | G06F 18/251 |

(Continued)

FOREIGN PATENT DOCUMENTS

| | | |
|---|---|---|
| CN | 108961811 B | 12/2020 |
| DE | 11 2017 002120 | 1/2019 |
| EP | 3 744 616 | 12/2020 |

(Continued)

OTHER PUBLICATIONS

Extended European Search Report dated Jan. 25, 2024 issued in EP Application No. 23192779.9.

(Continued)

*Primary Examiner* — Toya Pettiegrew
(74) *Attorney, Agent, or Firm* — DLA PIPER LLP US

(57) ABSTRACT

A method and apparatus for backward driving assist of a vehicle, the method comprises: obtaining first coordinate information for the real-time location of the vehicle; detecting an object around the vehicle, and obtaining second coordinate information for the real-time location of the vehicle; determining a location of the vehicle based on the first and second coordinate information; and performing backward driving assist control based on the determined location of the vehicle.

20 Claims, 12 Drawing Sheets

(56) References Cited

U.S. PATENT DOCUMENTS

2023/0230387 A1\* 7/2023 Herman ................ G06V 20/56
701/25
2024/0034404 A1\* 2/2024 Madiar ........... B60W 30/18036

FOREIGN PATENT DOCUMENTS

| KR | 2015-0077823 | 7/2015 |
| KR | 10-2021-0119626 | 10/2021 |

OTHER PUBLICATIONS

European Office Action dated Oct. 29, 2024, issued in EP Application No. 23192779.9.

\* cited by examiner

METHOD AND APPARATUS FOR BACKWARD DRIVING ASSIST OF VEHICLE

CROSS REFERENCE TO RELATED APPLICATION

The present application claims priority to Korean Patent Application No. 10-2022-0110990, filed on Sep. 1, 2022, the entire contents of which is incorporated herein for all purposes by this reference.

TECHNICAL FIELD

The present disclosure relates to a method and apparatus for backward driving assist that maximizes driver convenience and facilitates backward driving.

BACKGROUND

In general, many drivers complain of driving difficulties driving a vehicle in reverse. The complaint comes from the different trajectories between backward driving and forward driving. In addition, the complaint also comes from the need to manipulate the steering wheel while personally checking various elements such as the rearview mirror, side-view mirror, and rearview camera to check the reverse path and obstacles during reverse driving.

For example, when driving backward on narrow roads or roads where vehicles are parked on the sides, drivers need to reverse while judging the possibility of backward driving by checking the distance between the obstacles such as parked vehicles to avoid contact with the obstacles. Drivers also need to drive backward without pulling to either the right or left side of the reverse path while avoiding contact with the obstacles, which requires the driver's skill and special attention.

Accordingly, a backward driving assist system is being developed for safe and easy backward driving of drivers. In this regard, various technologies such as the technology of generating a reverse path for the vehicle to drive in reverse without contacting obstacles based on detection signals for the obstacles present in front of and behind the vehicle, the technology of controlling the reverse path to be the same as the immediately previous driving path based on an estimated previous driving trajectory (immediately previous forward path) recorded using a vehicle speed sensor and a steering angle sensor when the vehicle needs to reverse on the same path it just traveled, and the like have been proposed.

The matters described above as background technology are intended to provide a better understanding of the background of the present disclosure and should not be considered as acknowledging that the present disclosure pertains to the prior art already known to those skilled in the art.

SUMMARY DISCLOSURE

The present disclosure relates a method and apparatus for backward driving assist that allows maximum convenience and easy backward driving for drivers.

In particular, the present disclosure relates to a method and apparatus for backward driving assist that allows speed control as well as steering control during backward driving assist control.

Further, the present disclosure relates to a method and apparatus for backward driving assist that may even deal with a driver's intervention while backward driving assist control is performed.

Further, the present disclosure relates to a method and apparatus for backward driving assist that allows precise steering control and path tracking in consideration of the curvature of the forward driving trajectory.

Further, the present disclosure relates to a method and apparatus for backward driving assist that automatically stores a forward driving trajectory according to the need for backward driving assist.

Further, the present disclosure relates to a method and apparatus for backward driving assist that allows improved accuracy of location determination using a plurality of location estimation technologies.

The issues of the present disclosure are not limited to the issues described above, and other issues not mentioned will be clearly understood by those skilled in the art from the following description.

According to the present disclosure, a backward driving assist method includes: obtaining first coordinate information about the real-time location of a vehicle through a first sensor; detecting an object around the vehicle through a second sensor including a camera, and obtaining second coordinate information about the real-time location of the vehicle based on the relative location with respect to the detected object; determining the location of the vehicle based on the first coordinate information and the second coordinate information; and performing backward driving assist control based on the determined location of the vehicle.

For example, determining the detection accuracy of the second sensor may be further included, and the determination of the location of the vehicle may include determining the current location of the vehicle in further consideration of the detection accuracy.

For example, the detection accuracy may be determined based on at least one of the brightness around the second sensor and the number of objects detected through the second sensor.

For example, when an object detected through the second sensor has been previously detected, adjusting the location of the vehicle based on the relative location between the object and the vehicle at the time of the previous detection may be further included.

For example, determining a reverse path based on the forward driving trajectory of the vehicle, determining the location of an object behind the vehicle detected through the second sensor during backward driving when the object is an object not detected during forward driving, and adjusting the reverse path based on the location of the object not detected during forward driving may be further included.

For example, detecting the movement of an object behind the vehicle through the second sensor when the object was not detected during forward driving, and when the object is on the move, detecting an expected movement path of the object based on the location of the object may be further included, in which the adjustment of a reverse path may include adjusting the reverse path in further consideration of the expected movement path of the moving object.

For example, the first sensor may be a sensor that uses at least one of a Global Positioning System signal, a radio wave, and a laser.

According to the present disclosure, a backward driving assist apparatus of a vehicle includes a sensor unit that includes at least one sensor and a control unit that obtains first coordinate information about the real-time location of the vehicle through a first sensor, detects an object around the vehicle through a second sensor including a camera, obtains second coordinate information about the real-time location of the vehicle based on the relative location with respect to the detected object, and determines the location of the vehicle based on the first coordinate information and the second coordinate information to perform backward driving assist control based on the determined location of the vehicle.

For example, the control unit may determine the detection accuracy of the second sensor and may determine the current location of the vehicle in further consideration of the detection accuracy.

For example, the detection accuracy may be determined based on at least one of the brightness around the second sensor and the number of objects detected through the second sensor.

For example, when an object detected through the second sensor has been previously detected, the control unit may adjust the location of the vehicle based on the relative location between the object and the vehicle at the time of the previous detection.

For example, the control unit may determine a reverse path based on a forward driving trajectory of the vehicle, determine a location of an object behind the vehicle detected through the second sensor during backward driving when the object was not detected during forward driving, and adjust the reverse path based on the location of the object not detected during the forward driving.

For example, when an object behind the vehicle is an object not detected during forward driving, the control unit may detect the movement of the object through the second sensor, determine an expected movement path of the object based on the location of the object if the object is on the move, and adjust the reverse path in further consideration of the expected movement path of the moving object.

For example, the first sensor may be a sensor using at least one of the Global Position System (GPS) signal, a radio wave, and a laser.

The method and apparatus for the backward driving assist of a vehicle associated with at least one embodiment of the present disclosure having the configuration described above maximizes the driver's convenience and facilitates backward driving.

In particular, the present disclosure may alleviate the driver's anxiety by performing vehicle speed control in consideration of the maximum lateral acceleration during backward driving assist control.

Further, even when a driver intervenes in driving while backward driving assist control is performed, the control is not terminated immediately and the control may be maintained or terminated according to the driver's choice.

Further, precise steering control and path tracking are possible by considering the curvature of the forward driving trajectory during steering angle control.

Further, a forward driving trajectory is automatically stored according to the need for backward driving assist so that the driving trajectory is stored without the driver's intervention to prepare for unexpected backward driving.

Further, the accuracy of location determination may be improved by utilizing a plurality of location estimation technologies.

The effects obtainable from the present disclosure are not limited to the effects mentioned above, and other effects not mentioned will be clearly understood by those skilled in the art from the following description.

DETAILED DESCRIPTION

Figure 1:
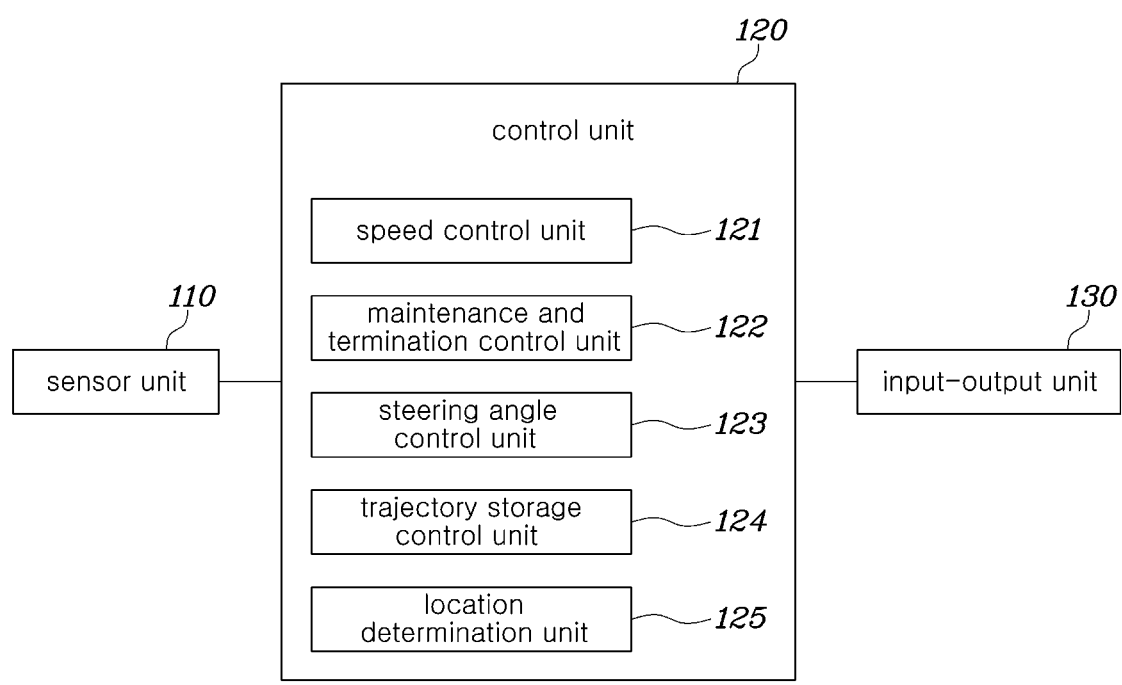
FIG. 1 is a view showing a configuration of a backward driving assist apparatus of a vehicle according to an embodiment of the present disclosure.

Specific structural or functional descriptions of the embodiments of the present disclosure disclosed herein or the application are presented only for the purpose of describing embodiments of the present disclosure, and the present disclosure may be implemented as various embodiments which should not be construed as limited to the embodiments described herein or in the application.

Since the embodiments according to the present disclosure may be subjected to various modifications and may assume many forms, specific embodiments will be illustrated in the drawings and described in detail herein or in the application. However, this is not intended to limit embodiments according to the concept of the present disclosures to particular disclosure forms and should be understood to include all modifications, equivalents, and substitutes included in the scope of ideas and technology of the present disclosure.

Unless defined otherwise, all terms used herein, including technical or scientific terms, have the same meaning as commonly understood by those with ordinary skill in the art to which the present disclosure pertains. Terms such as those defined in commonly used dictionaries should be construed as having a meaning consistent with the meaning in the context of the related art and are not to be construed in an ideal or overly formal meaning unless explicitly defined herein.

Embodiments disclosed herein will be described in detail with reference to the accompanying drawings below. The same or similar components will be given the same reference numerals regardless of the number of drawings, and repetitious descriptions thereof will be omitted.

The suffixes "module" and "unit" for the components used in the following description are given or interchangeably used only to facilitate the writing of the specification, without necessarily indicating a distinct meaning or role of their own.

when it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

In addition, a unit or a control unit included in the names such as a motor control unit (MCU), a hybrid control unit (HCU), and the like is a term widely used in the naming of controllers that control specific functions of a vehicle and does not mean a generic function unit.

A controller may include a communication device that communicates with other controllers or sensors to control functions it is charged with, a memory for storing an operating system, logic commands, input and output information, and the like, and one or more processors performing functions such as decision-making, calculation, determination, and the like required for controlling the functions with which it is charged.

Before describing a backward driving assist method of a vehicle according to embodiments of the present disclosure, a configuration of the backward driving assist apparatus applicable to the embodiments will be described first.

FIG. 1 is a view showing a configuration of a backward driving assist apparatus of a vehicle according to an embodiment of the present disclosure.

FIG. 1 shows that a backward driving assist apparatus according to an embodiment may include a sensor unit 110, a control unit 120, and an input-output unit 130. FIG. 1 highlights components related to embodiments of the present disclosure, and it is apparent to those skilled in the art that more components may be included in the actual implementation of a driving assist apparatus. Each component will be described below.

First, the sensor unit 110 may include a Global Positioning System (GPS) sensor, a LiDAR, sensor, a radar sensor, a camera, a speed sensor, a steering angle sensor, and the like. The sensor unit 110 may detect an obstacle within a preset range from the vehicle or the location of the vehicle through at least one sensor, or may also measure vehicle speed, and forward steering angle and detect gear shift position, and the like. In particular, the camera may obtain image information about the environment around the vehicle. The sensor unit 110 transmits these detection results to the control unit 120 so that the results can be utilized for backward driving assist control.

On the other hand, the control unit 120 receives the detection results from the sensor unit 110 and performs controls required for backward driving assist, and may include a speed control unit 121, a maintenance and termination control unit 122, a steering angle control unit, a trajectory storage control unit, and a location tracker. Specific functions performed by each configuration of the control unit 120 will be described below.

According to an embodiment, the speed control unit 121 may determine a reverse path based on a forward driving trajectory of the vehicle. The forward driving trajectory may be determined based on the detection results obtained through a vehicle speed sensor 111, a steering angle sensor 112, and the like, the reverse path may be determined to have the same trajectory as or correspond to the forward driving trajectory, and factors such as a destination during reversing may be further considered. The speed control unit 121 may determine the speed limits respectively corresponding to a plurality of points on the reverse path determined based on a preset maximum lateral acceleration. Here, the preset lateral acceleration may be determined in consideration of the driving behaviors of the vehicle according to the lateral acceleration and may be set through experiment values. The speed limit may refer to the maximum speed to be output at each point on the reverse path in consideration of the stability of a passenger when backward driving assist control is performed to drive along the reverse path of the vehicle. The plurality of points on the reverse path may refer to a plurality of points present at certain intervals along the reverse path. When the reverse path and the speed limit are determined, the speed control unit 121 determines a possibility of collision during backward driving based on the reverse path and the speed limit and performs backward driving assist control based on the speed limit by limiting the vehicle speed not to exceed the speed limit during backward driving assist control when it is determined that there is no possibility of collision.

The required steering angle may be larger than usual on some reverse paths, which may cause a driver to feel threatened and out of the way caused by an abrupt change in the lateral acceleration. The present disclosure may provide the passenger with a sense of stability during backward driving by determining the speed limit through a preset maximum lateral acceleration and performing backward driving assist control based thereon. Further, this allows the vehicle to drive at an appropriate speed without excessive deceleration while providing the passenger with a sense of stability.

On the other hand, when it is determined that there is a possibility of collision, the speed control unit 121 may perform driving control to bring the vehicle to a stop before the collision. Accordingly, when a possibility of collision is detected, the vehicle speed is controlled regardless of the speed limit so that an accident can be prevented by prioritizing collision avoidance over reaching the destination or passenger comfort.

The detection results of the sensor unit 110 may be used to determine the possibility of collision. For example, when no obstacle is detected through the sensor unit 110, the speed control unit 121 may determine that there is no possibility of collision. In contrast, when an obstacle is detected, since there is a risk of collision, the speed control unit 121 determines that there is a possibility of collision. In this case, the speed control unit 121 may determine whether the obstacle is on the move, and when it is determined that the obstacle is on the move, the speed control unit 121 may determine an expected path based on the moving speed of the obstacle and determine the possibility of collision based on the reverse path of the vehicle and the expected path of the obstacle.

More details on the determination of the speed limit and the possibility of collision will be described with reference to FIGS. 2A to 3 below.

According to the embodiment, the maintenance and termination control unit 122 may determine the reverse path based on the forward driving trajectory of the vehicle. The forward driving trajectory may be determined based on the detection results obtained through the vehicle speed sensor 111, the steering angle sensor 112, and the like, the reverse path may be determined to have the same trajectory as or correspond to the forward driving trajectory, and factors such as a destination during backward driving may be further considered. The maintenance and termination control unit 122 may set a deviation limit which serves as a criterion for terminating the backward driving control based on the determined reverse path. The degree of deviation from the path may be determined based on the reverse path and the current location of the vehicle detected through at least one sensor during backward driving of the vehicle, and the backward driving assist control may be maintained or terminated depending on whether the degree of deviation from the path exceeds the set deviation limit.

When the degree of deviation is within the deviation limit, the maintenance and termination control unit 122 may determine a return path to the reverse path and perform the backward driving assist control so that the vehicle returns to the reverse path based on the determined return path. In contrast, when the degree of deviation exceeds the deviation limit, it is determined that the driver has no intention to maintain the backward driving assist function, and the backward driving assist control is terminated.

On the other hand, the maintenance and termination control unit 122 may set the deviation limit in further consideration of the heading angle of the vehicle corresponding to each point on the determined reverse path. For example, heading angles corresponding to a plurality of points on the reverse path are calculated, and the deviation limit may be set to terminate the backward driving assist control when the vehicle deviates by a preset distance at the head angle that differs from a preset angle or more. In this case, the preset distance may be determined based on the length of the vehicle, or a fixed value may be set for each type of vehicle.

Further, the maintenance and termination control unit 122 may determine the possibility of collision based on the distance between the vehicle and the obstacle detected through the sensor unit 110 and the return path and may reduce the deviation limit when it is determined that there is a possibility of collision. When it is determined that there is a possibility of a collision while the vehicle deviating from the existing reverse path returns to the existing reverse path along the return path, the deviation limit is reduced to prevent deviation caused by the driver's intervention or the backward driving assist control is terminated so that no collision accident may occur while the vehicle returns to the existing reverse path.

On the other hand, the maintenance and termination control unit 122 may continuously monitor the activation status of the backward driving assist function and terminate the backward driving assist control when the function is deactivated. In this case, the activation status of the function may be monitored based on the input information received from the input-output unit 130.

On the other hand, the maintenance and termination control unit 122 may control the input-output unit 130 to output the deviation limit and the like. Details will be described with reference to FIG. 4 below.

According to the embodiment, the steering angle control unit 123 may determine a reverse path based on the forward driving trajectory of the vehicle. The forward driving trajectory may be determined based on the detection results obtained through the vehicle speed sensor 111, the steering angle sensor 112, and the like, the reverse path may be determined to have the same trajectory as or correspond to the forward driving trajectory, and factors such as the destination during backward driving may be further considered. On the other hand, the steering angle control unit 123 may determine the curvatures respectively corresponding to a plurality of first points on the forward driving trajectory based on the steering angle and the velocity measured through at least one sensor. A reverse steering angle may be determined based on the determined curvature for each of the plurality of second points on the reverse path matching each of the plurality of first points. Once the reverse steering angle is determined, backward driving control may be performed based on the reverse steering angle such that the vehicle may drive at the reverse steering angle corresponding to each of the second points on the reverse path.

The curvature of the driving trajectory or driving path may differ depending on the speed even at the same steering angle, which may cause errors in the path during backward driving. Further, the trajectory may differ between forward driving and backward driving even at the same steering angle. Accordingly, when backward driving control is performed using the steering angle used during forward driving, errors in the path may occur. In the present disclosure, the errors in the path during backward driving assist control caused by differences in speed or trajectory between forward driving and backward driving may be alleviated by determining the curvature of forward trajectory through velocity and steering angle respectively corresponding to a plurality of points on the forward driving trajectory and determining reverse steering angle using the determined curvature. More details will be described with reference to FIG. 5 below.

According to the embodiment, the trajectory storage control unit 124 may obtain image information about the driving environment in front of the vehicle through at least one sensor including a camera, and obtain road information and obstacle information from the obtained image information. The road information and obstacle information may be used in determining whether driving assist control is required during backward driving. When it is determined that the backward driving assist control is required and the vehicle is currently driving forward, the trajectory storage control unit 124 starts storing the forward driving trajectory so that backward driving assist control may be performed based on the stored forward driving trajectory.

As a result, a backward driving assist apparatus or a vehicle equipped therewith may determine the conditions in the surrounding which make backward driving difficult and store the forward driving trajectory on its own so that the stored forward driving trajectory may be used in backward driving assist control. Accordingly, the forward driving trajectory is stored even without the intervention of a driver so that situations in which backward driving is unexpectedly required can be dealt with.

In this case, the road information may include at least one of the width and curvature of the road included in the image information, and the obstacle information may include at least one of the number, type, and location of the obstacles included in the image information. Further, whether driving assist control is required during backward driving may be determined based on the information about the overall driving environment obtained through a combination of the road information and the obstacle information.

Further, the trajectory storage control unit 124 may determine whether backward driving assist control is required in further consideration of whether a driving trajectory storage request is input.

Further, the trajectory storage control unit 124 may determine whether or not to start storing the forward driving trajectory in further consideration of the distance to the obstacles measured through an ultrasonic sensor, a radar sensor, a LiDAR sensor, and the like as well as the road information and the obstacle information in the image information. For example, when the measured distance to an obstacle is less than a preset distance for a preset time or more, it may be assumed that driving is difficult, and the forward driving trajectory may be stored to perform backward driving assist control.

Further, the trajectory storage control unit 124 may determine whether a preset storage stop condition is met and stop storing the forward driving trajectory when the condition is met. In this case, the storage stop condition may be determined based on at least one of the gear shift position of the transmission, the duration of the vehicle's stop, and the activation status of the backward driving assist function. For example, when the gear shift position of the transmission is R or P and the vehicle has stopped for a long time, it is assumed that forward driving is terminated and thus the storage of the forward driving trajectory may stop. Details of the determination regarding whether backward driving assist control is required will be described with reference to FIG. 6 below.

According to the embodiment, a location determination unit 125 obtains first coordinate information about the real-time location of the vehicle through the first sensor of the sensor unit 110, detects an object around the vehicle through the second sensor including a camera, and obtains second coordinate information about the real-time location of the vehicle based on the relative location with respect to the detected objects. The location determination unit 125 determines the location of the vehicle based on the obtained first coordinate information and second coordinate information and performs backward driving assist control based on the determined location of the vehicle. For example, the location determination unit 125 generates a forward driving trajectory based on the determined location of the vehicle and uses the trajectory in determining a reverse path while performing backward driving assist control or determines whether the vehicle deviates from the reverse path during backward driving.

Here, the first sensor may include sensors that use at least one of the Global Positioning System (GPS) signal, a radio wave, and a laser. The second sensor includes a camera and may obtain visual information about the environment around the vehicle. The problem of accumulated small errors may be alleviated and the accuracy of location determination may be improved by determining the location of the vehicle in consideration of both the first coordinate information obtained through GPS or the like and the second coordinate information obtained through a camera and the like. Further, this allows more precise location determination even when there arise difficulties in accurately determining the location of the vehicle through sensors like a GPS sensor while the vehicle drives on a narrow road or indoors. Further, the relative distance with respect to objects detected through the second sensor is used in location determination so that the location of the vehicle can be determined even in a new environment where location information or information about the surrounding environment is unavailable.

In particular, the location determination unit 125 may use simultaneous localization and mapping (SLAM) technology to obtain the second coordinate information for the real-time location of the vehicle through the second sensor. The SLAM technology detects the surrounding environment through image sensors such as a camera while simultaneously constructing a map of the detected environment and estimating the current location therein. According to the embodiment, the surrounding environment such as objects around the vehicle may be detected through the second sensor such as a camera, and a coordinate system for the surrounding environment may be generated through the relative distance between the objects and the vehicle while the second coordinate information about the coordinates of the vehicle in the generated coordinate system may be simultaneously obtained.

Further, the location determination unit 125 may determine the detection accuracy of the second sensor and may further consider the detection accuracy of the second sensor as well as the first coordinate information and the second coordinate information in determining the current location of the vehicle. In this case, the detection accuracy of the second sensor may be determined based on at least one of the brightness around the second sensor and the number of objects detected through the second sensor. In this case, the location of the vehicle may be determined in consideration of the detection accuracy of the second sensor of the location determination unit 125 using the following formulae.

$$X_{Glo} = \frac{ACC_{sensor2}}{100} X_{sensor2} + \frac{100 - ACC_{sensor2}}{100} X_{sensor1}$$

$$Y_{Glo} = \frac{ACC_{sensor2}}{100} Y_{sensor2} + \frac{100 - ACC_{sensor2}}{100} Y_{sensor1}$$

$$\psi_{Glo} = \frac{ACC_{sensor2}}{100} \psi_{sensor2} + \frac{100 - ACC_{sensor2}}{100} \psi_{sensor1}$$

where $X_{sensor1}$, $Y_{sensor1}$, and $\psi_{sensor1}$ are first coordinate information, $X_{sensor2}$, $Y_{sensor2}$, and $\psi_{sensor2}$ are second coordinate information, $ACC_{sensor2}$ is the detection accuracy of the second sensor, and $X_{Glo}$, $Y_{Glo}$, and $\psi_{Glo}$ are coordinates of the location of the vehicle in each direction.

The detection accuracy of the second sensor may be influenced by the surrounding environment, and determining the detection accuracy of the second sensor and considering the accuracy in the determination of the location of the vehicle in the manner described above may reduce the possibility of errors. On the other hand, when the object detected through the second sensor is an object that has been previously detected, the location determination unit 125 may adjust the location of the vehicle based on the relative location between the object and the vehicle at the time of the previous detection. For example, when the object detected during forward driving is detected again during backward driving, the second coordinate information may be adjusted based on a comparison between the relative distance to the object during forward driving and the relative distance to the object during backward driving, and the location of the vehicle may be adjusted based on the adjusted second coordinate information.

On the other hand, the location determination unit 125 may determine a reverse path based on forward driving trajectory, and when an object detected through the second sensor behind the vehicle during backward driving is an object not detected during forward driving, the location determination unit 125 may determine the location of the object and adjust the reverse path based thereon. In this case, the location determination unit 125 may detect the movement of the object through the second sensor when the object behind the vehicle is an object not detected during forward driving and determine an expected movement path based on the location of the object when the object is determined to be moving. And the location determination unit 125 may adjust the reverse path in further consideration of the determined expected movement path of the object. Accordingly, collision with a newly emerged object during backward driving may be avoided.

On the other hand, each configuration of the control unit 120 and functions thereof have been described above, but this is merely an illustrative example and does not necessarily indicate that only a specific configuration performs a specific function. One configuration may perform various functions. Further, according to the present disclosure, when the backward driving assist control apparatus is implemented as a vehicle configuration, the control unit may be implemented as a function of a control unit usually installed in a vehicle. Here, the usually installed control unit may be a vehicle control unit (VCU) in an electric vehicle or a hybrid control unit (HCU) in a hybrid vehicle, but this is an illustrative example, to which the apparatus is not necessarily limited.

On the other hand, the input-output unit 130 may receive input information from a driver such as a command to activate or deactivate the backward driving assist function and output the input information so that the control unit 120 and the like may recognize the input information. Further, the input-output unit 130 may also output the location of the vehicle and the like according to the control signals of the control unit 120 so that the driver and the like may recognize the location of the vehicle.

According to the embodiment, when the degree of deviation from the path exceeds a first set value, the deviation limit may be output together with the current location of the vehicle, and when the degree of deviation from the path exceeds a second set value, a warning notification may be output. The outputting, in this case, may be performed based on the control signal of the maintenance and termination control unit 122, and the second set value may be equal to or greater than the first set value. As a result, when the vehicle deviates from a path during backward driving assist control due to the driver's intervention, the driver is made aware of the deviation from the path, and when the degree of deviation from the path increases, a warning about the termination of the backward driving assist control may be issued.

Further, the input-output unit 130 may output a notification for forward trajectory storage in progress or storage start/end and may receive a forward trajectory storage request to output the same.

A specific method of performing backward driving assist control through each configuration of the backward driving assist apparatus according to the embodiment of the present described in FIG. 1 will be described with reference to FIGS. 2A to 6 below.

Figure 2A:
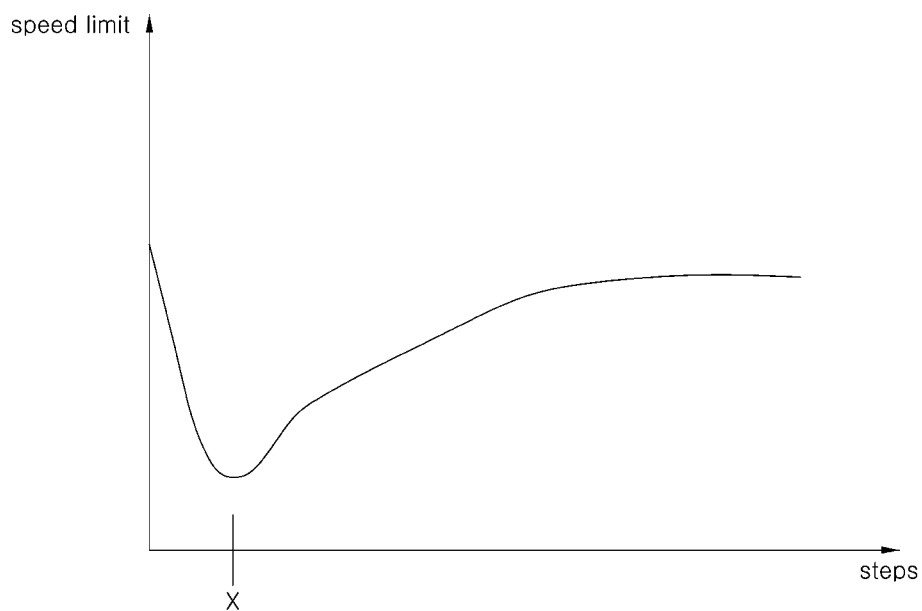
FIGS. 2A and 2B are views for describing the determination of a speed limit according to an embodiment of the present disclosure.
Figure 2B:
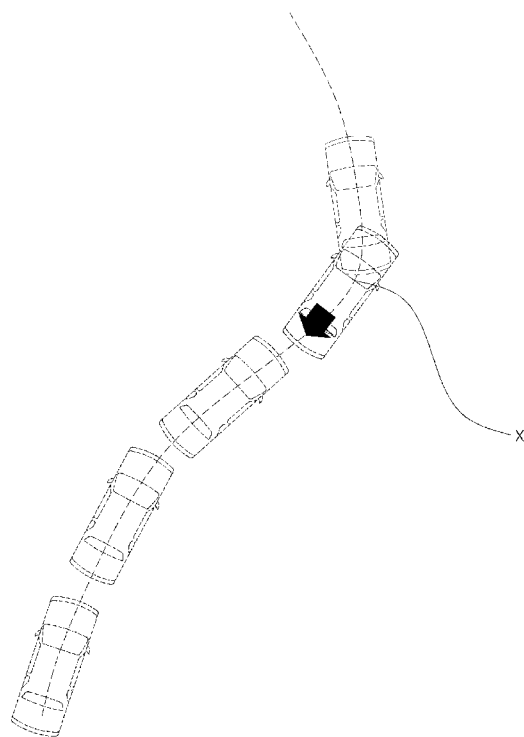

FIGS. 2A and 2B are views for describing the determination of a speed limit according to an embodiment of the present disclosure.

FIGS. 2A and 2B show an example of a graph with one axis representing speed and the other axis representing steps and a reverse path corresponding thereto to describe the speed limit determination according to the embodiment. Here, the steps may refer to a set of a plurality of points on the reverse path, and a smaller value represents a point closer to the start time of backward driving and a larger value represents a point closer to the destination of the reverse path.

In determining the speed limit, the speed control unit 121 may determine the curvatures respectively corresponding to a plurality of points on the reverse path and may determine the speed limits corresponding to the plurality of points on the reverse path in further consideration of the determined curvature. The lateral acceleration of the vehicle is influenced by the turning radius of the vehicle and the vehicle speed, and the turning radius of the vehicle corresponds to the curvature of the driving path. As the curvature of the driving path increases, the required turning radius also increases. Therefore, the vehicle speed may be derived based on the lateral acceleration and the curvature. In this case, when a preset maximum lateral acceleration is used in deriving the vehicle speed with the passenger's sense of stability taken into consideration, a speed limit, which is the maximum speed that allows the lateral acceleration equal to or less than the maximum lateral acceleration, may be obtained. When the maximum lateral acceleration is fixed to a certain value, the speed limit may have a smaller value as the curvature has a larger value, and the speed limit may have a larger value as the curvature has a smaller value.

In the example of FIG. 2B, point X is assumed to be a point having the greatest curvature among the plurality of points on the reverse path of the vehicle. The graph of FIG. 2A corresponding to the example shows that the speed decreases as the point X is approached from the origin and increases again once the point X is passed. Since the speed limit decreases as the curvature has a greater value, it may be determined that the speed limit has the smallest value at the point X where the curvature has the maximum value.

Determination accuracy of the speed limit may be improved by considering the curvatures respectively corresponding to a plurality of points on the reverse path along with the maximum lateral acceleration in the determination of the speed limit.

Figure 3:
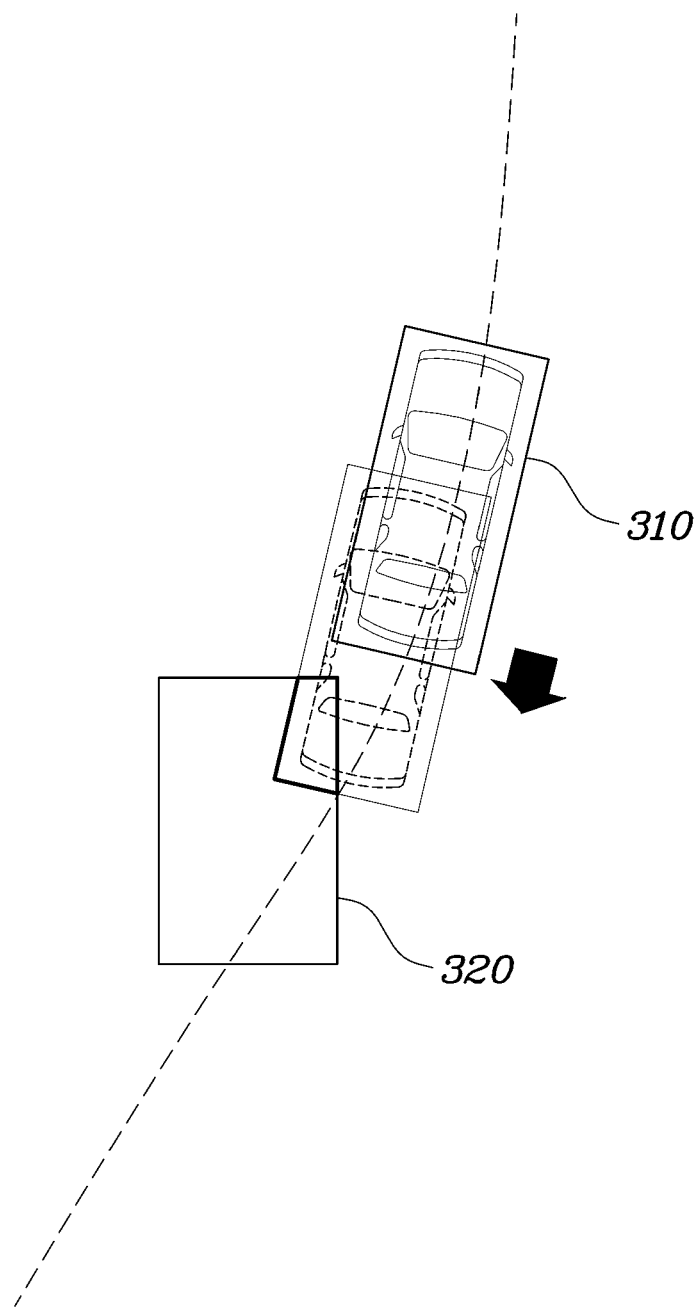
FIG. 3 is a view for describing the determination of a collision possibility according to an embodiment of the present disclosure.

FIG. 3 is a view for describing the determination of a collision possibility according to an embodiment of the present disclosure.

FIG. 3 shows an area 310 corresponding to a vehicle driving along a reverse path and an area 320 corresponding to an obstacle on the reverse path. The speed control unit 121 may obtain virtual areas 310, 320 respectively corresponding to the vehicle and the obstacle, and may determine the occurrence of collision based on the degree of overlap between the determined reverse path of the vehicle and each of the virtual areas 310, 320.

The virtual areas may be preset to correspond to at least one of the type, size, and shape of the vehicle and the obstacle and thereby reflect features of the vehicle and the obstacle. For example, when the area of the overlapping portion between the area 310 corresponding to the vehicle located on the reverse path at a specific time and the area 320 corresponding to the obstacle at the same moment is equal to or greater than a certain value, it may be determined that there is a possibility of collision. The area corresponding to each may not be the same as or similar to the actual size or shape of the vehicle or the obstacle, and may be represented by a specific three-dimensional figure determined in overall consideration of avoidance capability of an expected collision, the degree of danger in the event of a collision, and the like based on the type, size, shape, or the like.

Determination of the collision possibility as described above may be performed by a Minkowski Portal Refinement collision detection algorithm that detects a collision based on the overlap between the three-dimensional figures.

Figure 4:
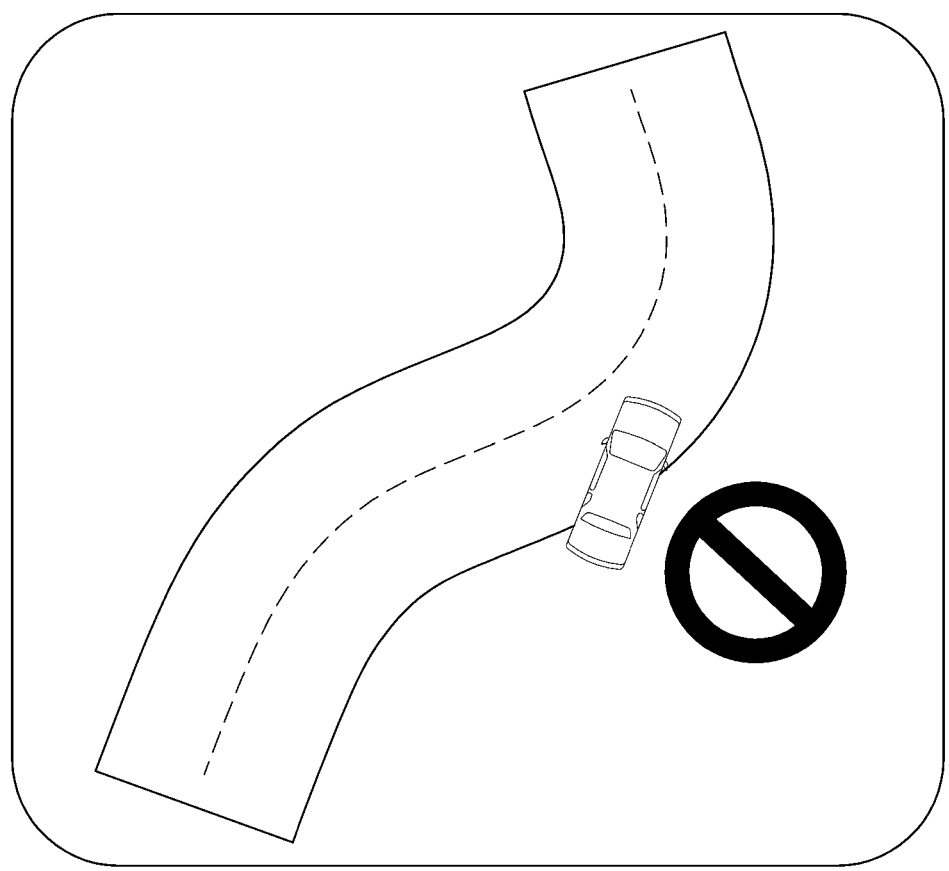
FIG. 4 is a view for describing the performance of maintenance and termination control of backward driving assist according to an embodiment of the present disclosure.

FIG. 4 is a view for describing the performance of maintenance and termination control of backward driving assist according to an embodiment of the present disclosure.

FIG. 4 shows that the input-output unit 130 may visually output the deviation limit based on the reverse path, so that the driver may recognize the deviation limit. Here, the deviation limit refers to the degree of deviation that serves as the basis for maintaining/terminating the backward driving assist control, and the degree of deviation may refer to the distance between the reverse path and the location of the vehicle, the degree of overlap between a certain area near the reverse path and the vehicle, and the like.

Further, the input-output unit (130) may output the current location of the vehicle along with the deviation limit. Outputting the deviation limit in this way may be performed when the degree of path deviation exceeds a first set value. For example, when the vehicle is not located on the reverse path due to the driver's intervention during backward driving assist control, the input-output unit 130 may output the deviation limit and the location of the vehicle so that the driver may recognize that the backward driving assist control may be terminated. In this case, the driver who recognizes the deviation limit and the location of the vehicle through the input-output unit 130 may intervene in the driving only within the deviation limit if they want to maintain the backward driving support control.

Further, the input-output unit 130 may output a warning notification when the degree of deviation exceeds the second set value. In this case, the warning notification may be issued by outputting a warning icon through a display or an alarm through audio. On the other hand, the second set value is a set value of the deviation limit having a value equal to or greater than the first set value. When the first and second set values are set to be the same, the warning notification may be output at the same time the deviation limit is output. When there is a difference between the first and second set values, the deviation limit is first output for the driver to recognize the deviation from the reverse path, and then the driver may be made aware of the deviation once again through the warning notification when the degree of deviation further increases and approaches the deviation limit. In this way, the driver may be made aware of the deviation from the reverse path and the possible termination of the backward driving apparatus control, without causing inconvenience by unnecessary warning notifications that may interfere with driving concentration.

Figure 5:
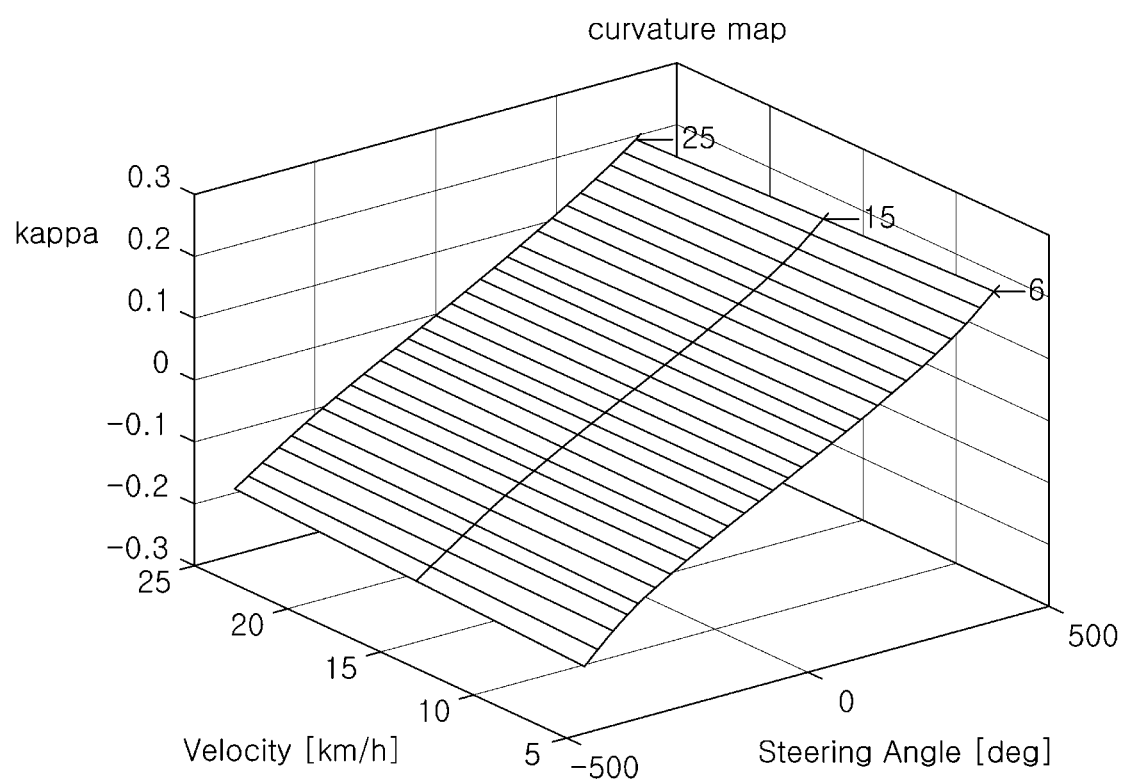
FIG. 5 is a view showing a curvature map according to velocity and steering angle according to an embodiment of the present disclosure.

FIG. 5 is a view showing a curvature map according to velocity and steering angle according to an embodiment of the present disclosure.

FIG. 5 shows that the curvature map according to an embodiment represents curvature, velocity, and steering angle on each axis. The steering angle control unit 123 may determine the curvature corresponding to each of the plurality of first points on the forward driving trajectory based on the steering angle and velocity measured through at least one sensor, and in some embodiments, the vehicle type may be additionally considered in determining the curvature. Further, the steering angle control unit 123 may refer to the curvature map according to the velocity and the steering angle to determine the curvature. For example, the curvature may be determined to be 0° when the steering angle is 0° and the velocity is 15 km/h during forward driving. Such a curvature map may be obtained based on experimental values for the vehicle type (i.e., geometric features such as size or shape of the vehicle) as well as the direction of travel (forward or backward), velocity, and steering angle.

On the other hand, the steering angle control unit 123 may determine the reverse steering angle based on the determined curvature, and at least one of the reverse velocity and the vehicle type may be further considered in determining the reverse steering angle. On the other hand, the steering angle control unit 123 may determine the reverse steering angle with reference to the curvature map according to the velocity and steering angle. For example, the reverse steering angle may be determined by substituting the curvature and reverse velocity determined based on the forward steering angle and velocity.

Further, the steering angle control unit 123 may adjust the determined reverse steering angle and perform backward driving assist control based on the adjusted reverse steering angle. In this case, feedback factors such as the location of the vehicle, reverse path, or heading angle may be considered in adjusting the reverse steering angle. For example, the coordinate difference between the location of the vehicle and the endpoint of the reverse path, the angle difference between the endpoint of the reverse path and the current heading angle of the vehicle, and the like may be considered in adjusting the reverse steering angle to ensure that the vehicle reaches the destination safely without deviating from the reverse path during backward driving.

Figure 6:
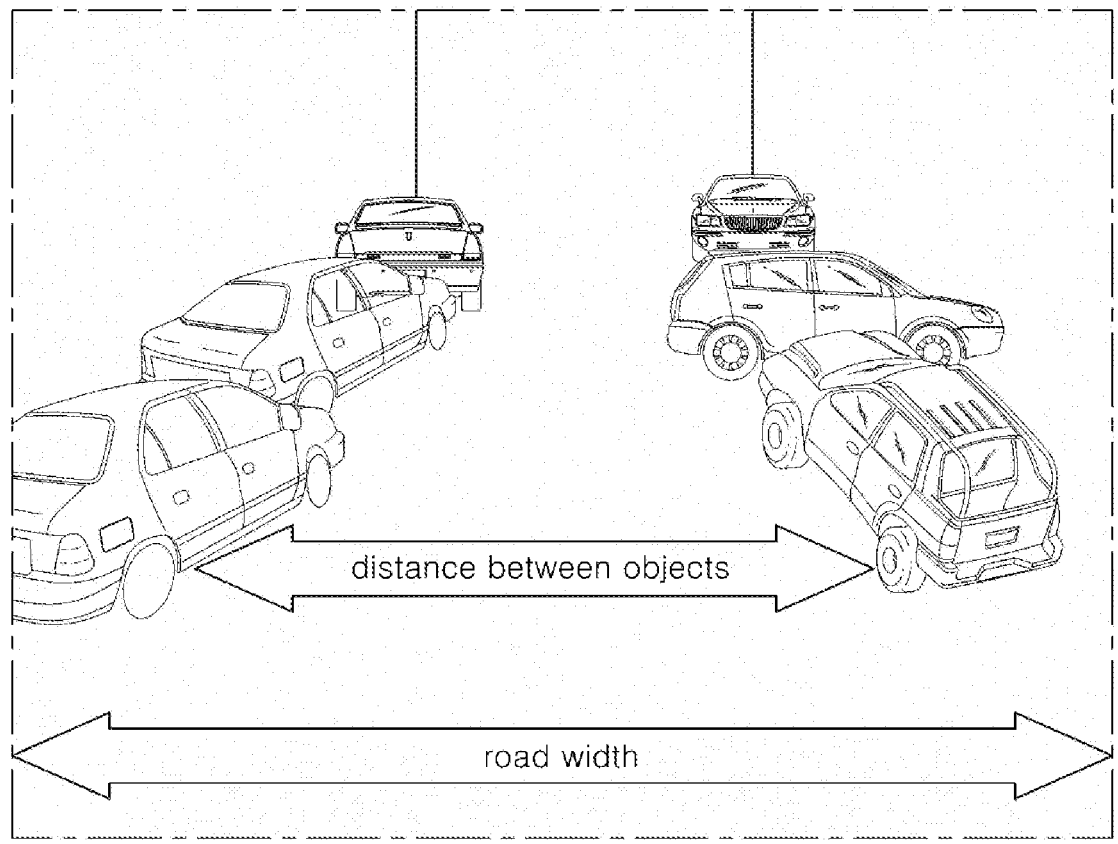
FIG. 6 is a view for describing a path storage control according to an embodiment of the present disclosure.

FIG. 6 is a view for describing a path storage control according to an embodiment of the present disclosure.

FIG. 6 shows that image information about the driving environment in front of the vehicle obtained through at least one sensor, including a camera, is displayed. The obtained image information may include roads and obstacles such as neighboring vehicles and the like, and the trajectory storage control unit 124 may obtain such road information and obstacle information from the image information. When the vehicle is currently driving forward, the trajectory storage control unit 124 may start storing the forward driving trajectory based on the road information and the obstacle information to perform the backward driving assist control such as generating a reverse path. When it is predicted that backward driving assist control will be required in light of the determination results based on the road information and the obstacle information, the forward driving trajectory is automatically stored even without the driver's intervention to store the forward driving trajectory.

For example, as shown in FIG. 6, when the road width in the road information is less than a preset width, forward driving trajectory storage may start for backward driving assist on the narrow road. Further, when the number of neighboring vehicles included in the obstacle information is equal to or greater than a certain number, the forward driving trajectory may also be stored to overcome the restraint on backward driving caused by the vehicles and prevent a collision. On the other hand, even when the road width is greater than a preset width and there is no difficulty in backward driving, the forward driving trajectory storage may automatically start if the overall determination based on the road information and the obstacle information indicates that the actual drivable width of the road is less than a preset value due to vehicles parked on the road. Further, even when there is no restraint on the backward driving due to road width or obstacles on the road, the trajectory storage control unit 124 may start storing the forward driving trajectory if difficulty may arise in backward driving due to a spiral structure of the road and the like.

On the other hand, the trajectory storage control unit 124 may recognize roads and other obstacles in the image information separately in obtaining the road information and the obstacle information from the image information. In this case, the trajectory control unit 124 may obtain the road information and the obstacle information based on preset feature information to correspond to roads and obstacles respectively, and such processes may be performed by inputting the obtained image information into an artificial intelligence learning model. Here, the artificial intelligence learning model is an artificial intelligence algorithm and may include machine learning, neural network, deep learning, classification algorithms, and the like.

Figure 7:
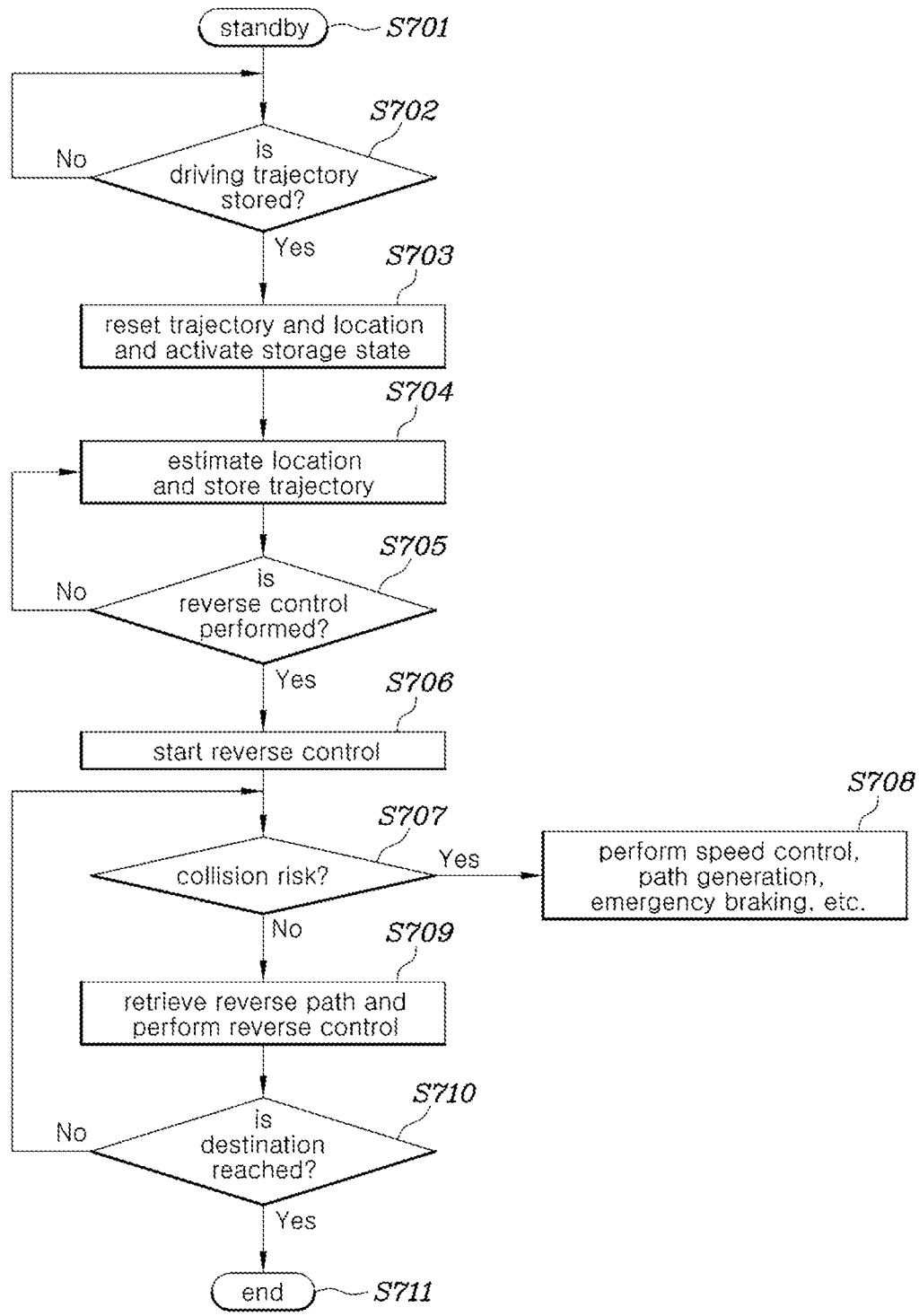
FIG. 7 is a flowchart of a backward driving assist control process according to an embodiment of the present disclosure.

A flowchart showing the entire process of backward driving assist control described thus far is shown in FIG. 7.

FIG. 7 is a flowchart of a backward driving assist control process according to an embodiment of the present disclosure.

FIG. 7 shows that the sensor unit 110 constantly detects the surrounding environment in the standby state (S701). Then, the control unit 120 may determine whether or not to store the forward driving trajectory based on the driver's request for storage or its own determination (S702). The control unit 120 resets the existing trajectory and location and activates the storage state when storing the forward driving trajectory (S703). Then, the control unit 120 stores the forward driving trajectory while estimating the location during driving (S704). Subsequently, the backward driving assist function is activated (Yes in S705), and the backward driving assist control starts (S706). In this case, the control unit 120 may detect a collision risk during backward driving, and when a collision risk is detected (Yes in S707), the control unit 120 may avoid the collision by controlling the speed, regenerating the path, applying emergency braking, or the like. If no collision risk is detected (No in S707), the control unit 120 can perform backward driving assist control based on the reverse path determined according to the forward driving trajectory, controlled velocity, or controlled steering angle (S709). When the destination, which is the endpoint of the reverse path, is reached (Yes in S710), the control is terminated (S711). Details of control performed in each process will be described with reference to FIGS. 8 to 12.

Figure 8:
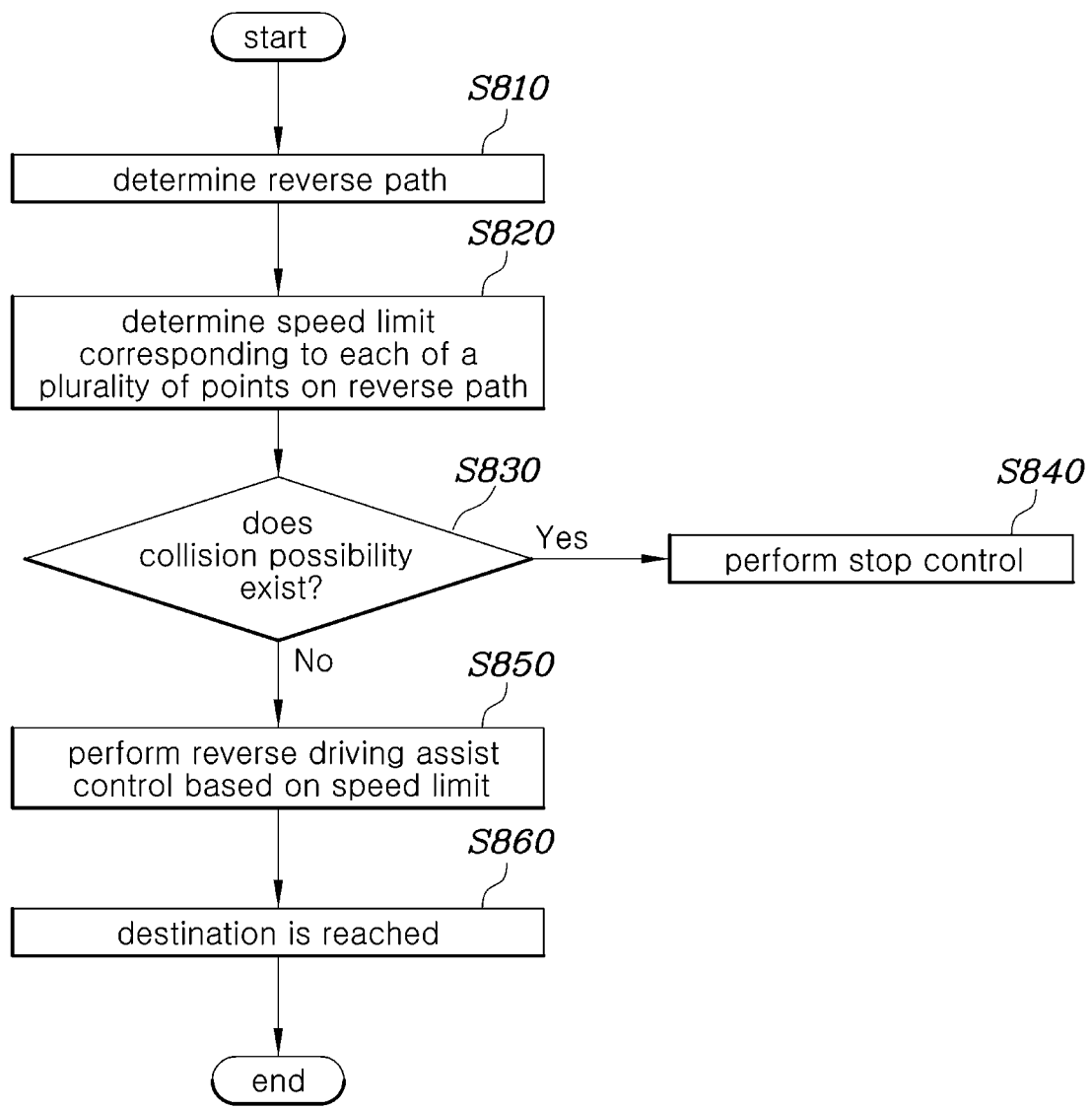
FIG. 8 is a flowchart showing a speed control process in backward driving assist control according to an embodiment of the present disclosure.

FIG. 8 is a flowchart showing a speed control process in backward driving assist control according to an embodiment of the present disclosure.

FIG. 8 shows that the speed control unit 121 determines the reverse path based on the forward driving trajectory of the vehicle (S810). When the reverse path is determined, the speed control unit 121 determines speed limits respectively corresponding to a plurality of points on the reverse path based on a preset maximum lateral acceleration (S820). When the determination of a collision possibility during backward driving based on the determined reverse path and the speed limit indicates that there is no collision possibility (No in S830), the speed control unit 121 performs backward driving assist control according to the determined speed limit (S850). In contrast, when there exists a collision possibility (Yes in S830), stop control is performed to avoid a collision (S840). When the vehicle reaches the destination thereafter (S860), backward driving assist control is terminated.

Figure 9:
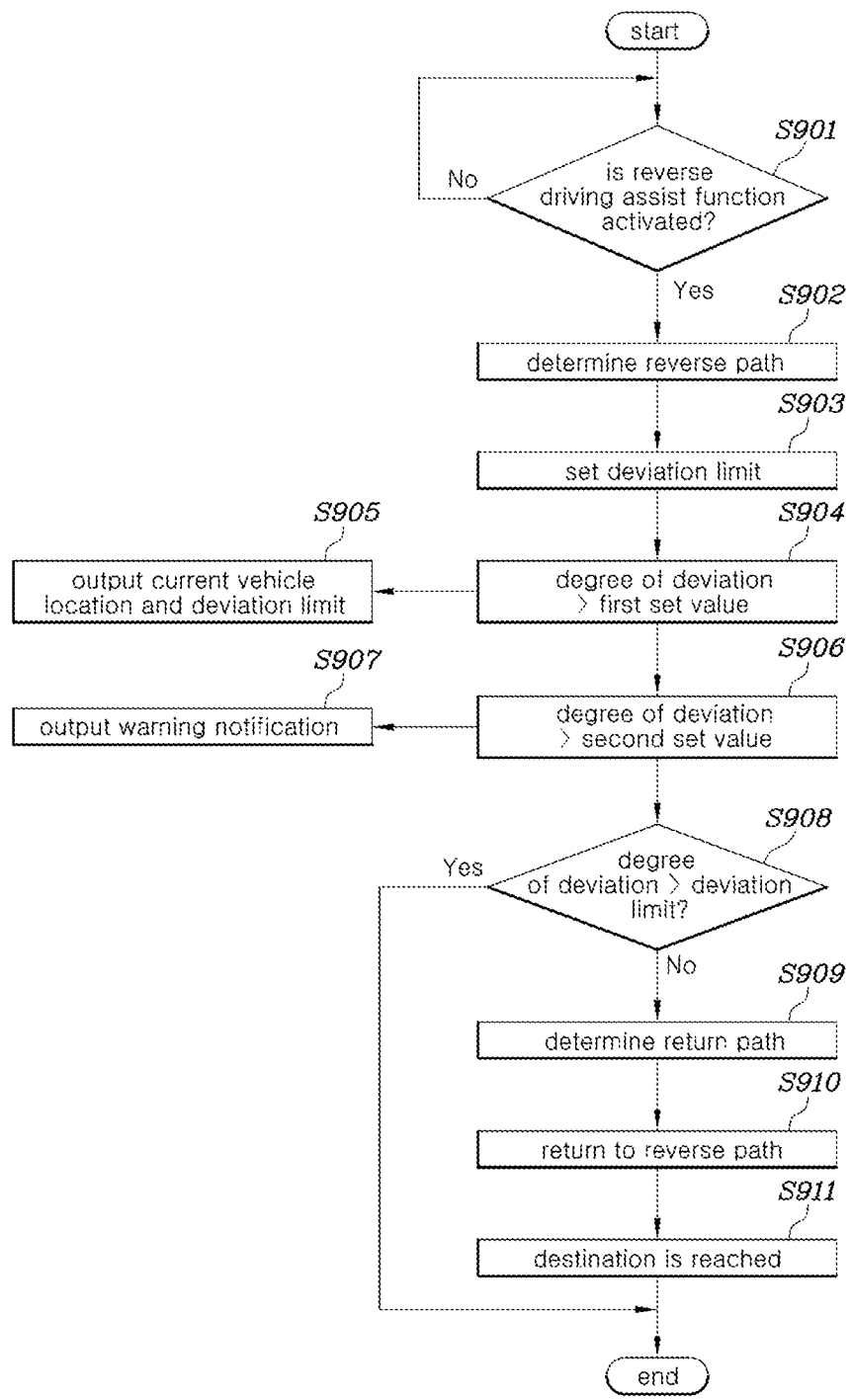
FIG. 9 is a flowchart showing a control maintenance and termination control process in backward driving assist control according to an embodiment of the present disclosure.

FIG. 9 is a flowchart showing a control maintenance and termination control process in backward driving assist control according to an embodiment of the present disclosure.

FIG. 9 shows that the maintenance and termination control unit 122 may check whether the backward driving assist function is activated through the input-output unit 130. When the backward driving assist function is activated (Yes in S901), the maintenance and termination control unit 122 may determine a reverse path based on the forward driving trajectory (S902) and may set a deviation limit which serves as a criterion for terminating the backward driving control based on the determined reverse path (S903). Then, the maintenance and termination control unit 122 determines the degree of deviation based on the reverse path and the location of the vehicle and outputs the current location of the vehicle and the deviation limit through the input-output unit 130 (S905) when the degree of deviation exceeds the first set value (S904). When the degree of deviation exceeds the second set value (S906), a warning notification is additionally output (S907). Then, when the degree of deviation exceeds the deviation limit (Yes in S908), the backward driving assist control is terminated. In contrast, when the degree of deviation does not exceed the deviation limit (No in S908), the performance of the backward driving assist control is maintained, the maintenance and termination control unit 122 determines a return path to the reverse path (S909), and when the destination is reached along the reverse path (S911) after the vehicle returns to the reverse path along the return path (S910), the backward driving assist control is finally terminated.

Figure 10:
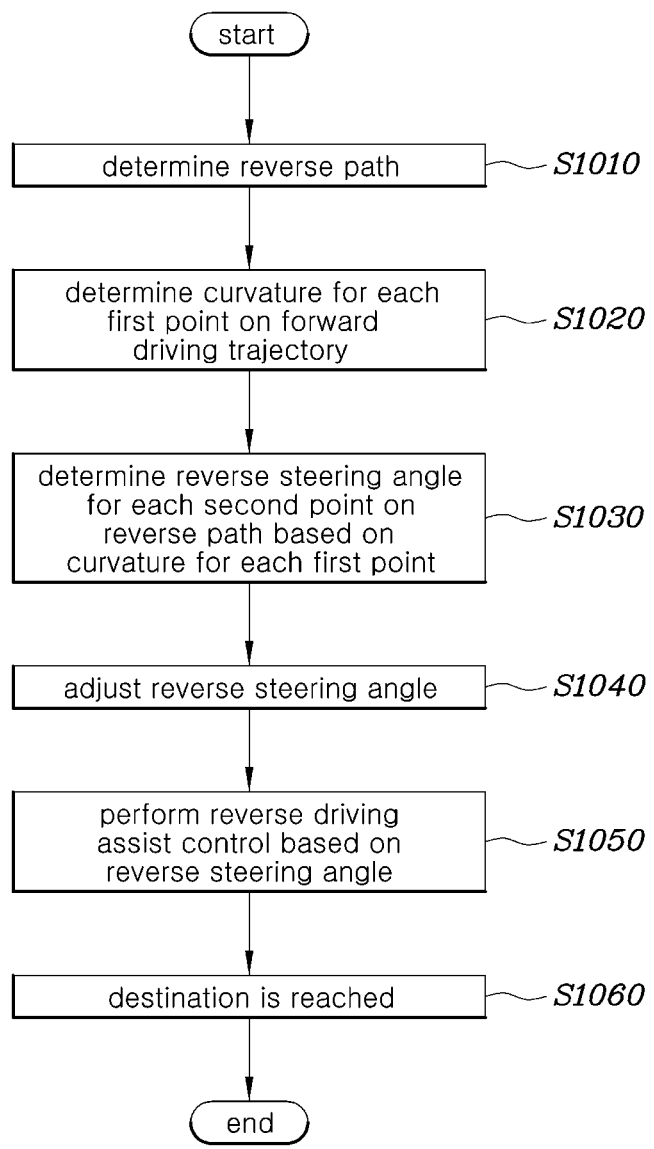
FIG. 10 is a flowchart showing a steering angle control process in backward driving assist control according to an embodiment of the present disclosure.

FIG. 10 is a flowchart showing a steering angle control process in backward driving assist control according to an embodiment of the present disclosure.

FIG. 10 shows that the steering angle control unit 123 may obtain a forward driving trajectory and obtain a reverse path based thereon (S1010). Then, the steering angle control unit 123 determines the curvature for each of the plurality of first points on the forward driving trajectory (S1020) and determines the reverse steering angle corresponding to each of the plurality of second points on the reverse path based on the determined curvature (S1030). Here, the second points are a plurality of points on the reverse path and correspond to the first points on the forward driving trajectory. On the other hand, the steering angle control unit 123 may adjust the reverse path based on the location of the vehicle, the reverse path, or the heading angle of the vehicle and improve reverse path tracking performance (S1040). The determined or adjusted reverse steering angle is used during backward driving assist control, and the steering angle control unit 123 may perform the backward driving assist control based on the reverse steering angle (S1050). As the destination is reached afterward (S1060), backward driving assist control is terminated.

Figure 11:
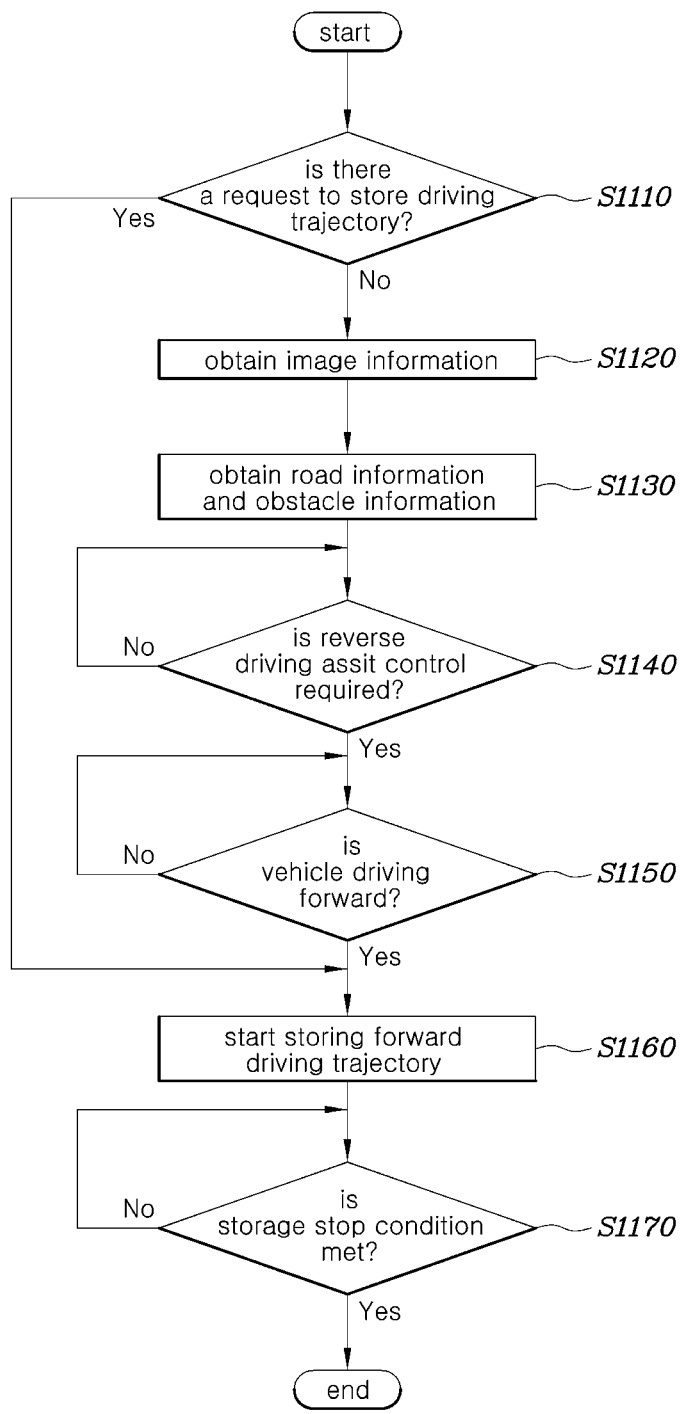
FIG. 11 is a flowchart showing a driving trajectory storage control process in backward driving assist control according to an embodiment of the present disclosure.

FIG. 11 is a flowchart showing a driving trajectory storage control process in the backward driving assist control according to an embodiment of the present disclosure.

FIG. 11 shows that the trajectory storage control unit 124 may start storing the forward driving trajectory (S1160) when the trajectory control unit 124 receives a request to store the driving trajectory through the input-output unit 130 (Yes in S1110). When there is no request to store the driving trajectory (No in S1110), the trajectory storage control unit 124 obtains image information through a sensor such as a camera (S1120) and obtains the road information and the obstacle information from the image information (S1130). The trajectory storage control unit 124 may start storing the forward driving trajectory based on the road information and the obstacle information, and in particular, may start storing the forward driving trajectory if the vehicle is driving forward when it is determined that the backward driving assist control is required in light of the road information and the obstacle information (S1140, S1150, S1160). When the storage stop condition such as the gear shift position, stop duration, activation of the backward driving assist function, and the like is met (Yes in S1170), the trajectory storage control unit 124 stops storing the forward driving trajectory (S1170).

Figure 12:
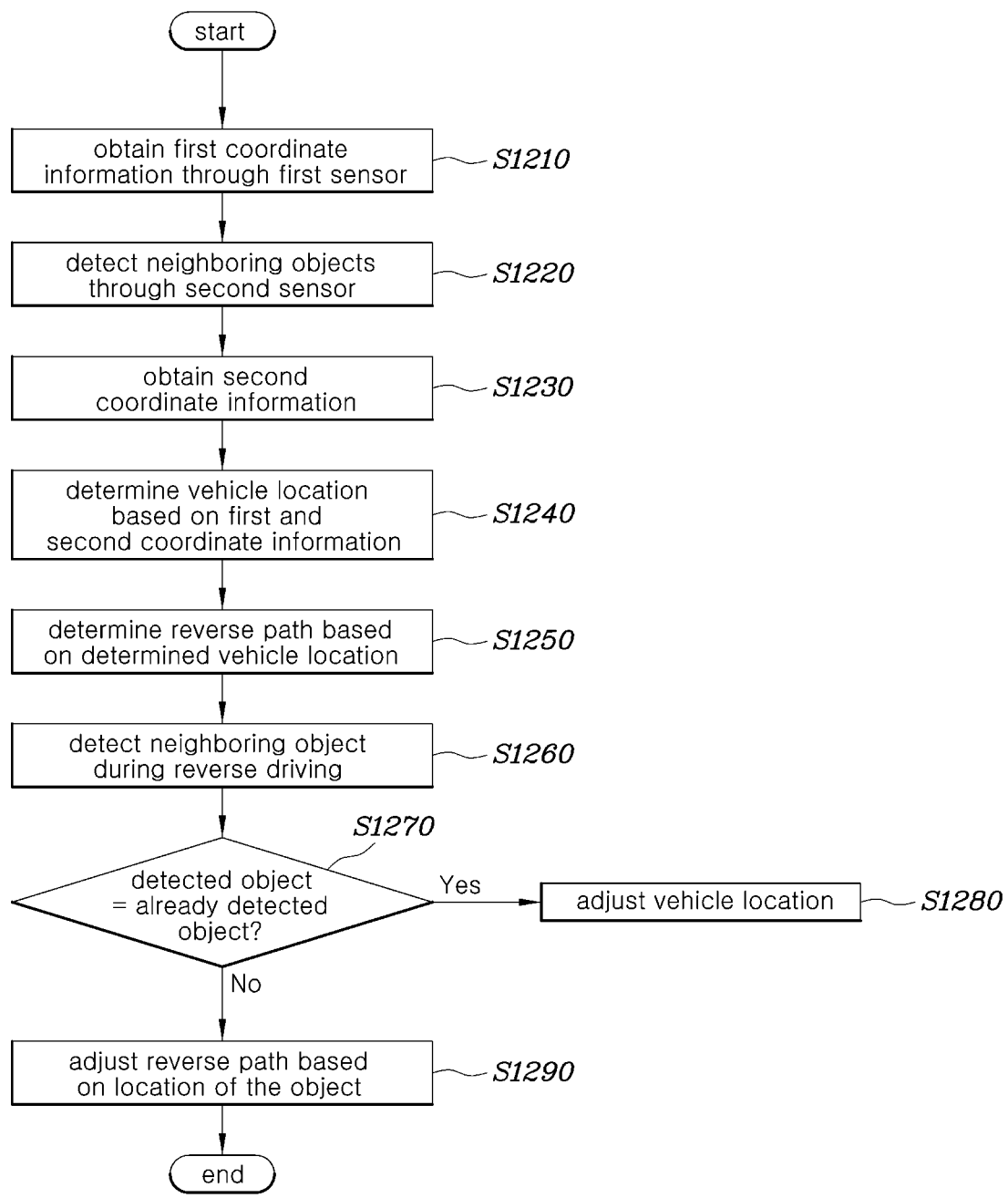
FIG. 12 is a flowchart showing a location determination process in backward driving assist control according to an embodiment of the present disclosure.

FIG. 12 is a flowchart showing a location determination process in backward driving assist control according to an embodiment of the present disclosure.

FIG. 12 shows that the location determination unit 125 may obtain the first coordinate information through the first sensor (S1210), detect neighboring objects through the sensors including a camera in parallel therewith (S1220), and obtain the second coordinate information through the relative distance between the detected neighboring objects and the vehicle (S1230). Then the location determination unit 125 may determine the location of the vehicle by combining the first coordinate information and the second coordinate information (S1240), and perform the backward driving assist control based thereon. An example of the backward driving assist control is that the location determination unit 125 may determine a reverse path based on the location of the vehicle (S1250). The location determination unit continuously detects the neighboring objects through sensors while driving on the reverse path (S1260). When an object detected during backward driving is an object that has already been detected (Yes in S1270), the location of the vehicle may be adjusted based on the relative distance between the object and the vehicle at the time of the previous detection (S1280). When an object detected during backward driving is an object that has not been detected during forward driving (No in S1270), the reverse path may be adjusted based on the location of the object to avoid a collision (S1290). Afterward, the backward driving assist control is terminated when the destination is reached.

The present disclosure described above can be implemented as a computer-readable code on a medium on which a program is recorded. The computer-readable medium includes all types of recording devices in which data that can be read by a computer system is stored. Examples of computer-readable media are a hard disk drive (HDD), a solid state disk (SSD), a silicon disk drive (SDD), ROM, RAM, CD-ROM, a magnetic tape, a floppy disk, an optical data storage device, and the like.

The method and apparatus for backward driving assist of a vehicle related to at least one embodiment of the present disclosure configured as described above maximize driver convenience and facilitate backward driving.

In particular, the present disclosure may alleviate a driver's anxiety by performing vehicle speed control in consideration of the maximum lateral acceleration during backward driving assist control.

Further, even when the driver intervenes in driving while backward driving assist control is performed, the control is not immediately terminated, and maintenance or termination may be determined according to the driver's choice.

Further, precise steering control and path tracking are possible by considering the curvature of the forward driving trajectory during steering angle control.

Further, the forward driving trajectory is automatically stored according to the need for backward driving assist so that the driving trajectory is stored even without the driver's intervention to prepare for an unexpected backward driving.

Further, the accuracy of location determination may be improved by utilizing a plurality of location estimation technologies.

Specific embodiments of the present disclosure have been illustrated and described, but it will be apparent to those skilled in the art that the present disclosure may be variously improved upon and modified within the scope not departing from the technical spirit of the present disclosure provided by the following claims.

What is claimed is:

1. A backward driving assist method for a vehicle, said method comprising:
    obtaining first coordinate information about a real-time location of the vehicle through a first sensor;
    detecting an object around the vehicle through a second sensor comprising a camera;
    obtaining second coordinate information about the real-time location of the vehicle based on a relative location with respect to the detected object;
    determining the location of the vehicle based on the first coordinate information and the second coordinate information; and
    performing backward driving assist control based on the determined location of the vehicle.

2. The method of claim 1, further comprising determining a detection accuracy of the second sensor, wherein the determination of the location of the vehicle comprises determining a current location of the vehicle in consideration of the detection accuracy.

3. The method of claim 2, wherein the detection accuracy is determined based on at least one of a brightness around the second sensor and a number of objects detected through the second sensor.

4. The method of claim 1, further comprising, when an object detected through the second sensor has been previously detected, adjusting the location of the vehicle based on the relative location between the object and the vehicle at a time of the previous detection.

5. The method of claim 1, further comprising:
    determining a reverse path based on a forward driving trajectory of the vehicle;
    when an object behind the vehicle detected through the second sensor during backward driving is not detected during forward driving, determining the location of the object; and
    adjusting the reverse path based on the location of the object not detected during forward driving.

6. The method of claim 5, further comprising:
    when the object behind the vehicle is an object not detected during forward driving, detecting movement of the object through the second sensor; and
    when the object is moving, determining an expected movement path of the moving object based on the location of the object, wherein:

the adjustment of the reverse path comprises adjusting the reverse path in consideration of the expected movement path of the moving object.

7. The method of claim 1, wherein the first sensor is a sensor using at least one of a Global Positioning System (GPS), radio wave, and laser.

8. A non-transitory computer-readable recording medium storing computer instructions that, when executed by a computer, cause the computer to:
   obtain first coordinate information about a real-time location of the vehicle through a first sensor;
   detect an object around the vehicle through a second sensor comprising a camera;
   obtain second coordinate information about the real-time location of the vehicle based on a relative location with respect to the detected object;
   determine the location of the vehicle based on the first coordinate information and the second coordinate information; and
   perform backward driving assist control based on the determined location of the vehicle.

9. A backward driving assist apparatus comprising:
   a sensor unit comprising at least one sensor; and
   a control unit obtaining first coordinate information about a real-time location of a vehicle through a first sensor, detecting an object around the vehicle through a second sensor comprising a camera, obtaining second coordinate information about the real-time location of the vehicle based on a relative location with respect to the detected object, and determining a position of the vehicle based on the first coordinate information and the second coordinate information to perform backward driving assist control based on the determined location of the vehicle.

10. The apparatus of claim 9, wherein the control unit determines a detection accuracy of the second sensor and may determine a current position of the vehicle in consideration of the detection accuracy.

11. The apparatus of claim 10, wherein the detection accuracy is determined based on at least one of a brightness around the second sensor and a number of objects detected through the second sensor.

12. The apparatus of claim 9, wherein when an object detected through the second sensor has been previously detected, the control unit adjusts the position of the vehicle based on the relative location between the object and the vehicle at a time of the previous detection.

13. The apparatus of claim 9, wherein the control unit determines a reverse path based on a previous driving trajectory of the vehicle, determines a position of an object behind the vehicle detected through the second sensor during backward driving when the object was not detected during forward driving and adjusts the reverse path based on the position of the object not detected during forward driving.

14. The apparatus of claim 13, wherein when the object behind the vehicle is an object not detected during forward driving, the control unit detects movement of the object through the second sensor, determines an expected movement path of the object based on the position of the object when the object is moving, and adjusts the reverse path in consideration of the expected movement path of the moving object.

15. The apparatus of claim 9, wherein the first sensor is a sensor using at least one of a Global Position System (GPS) signal, radio wave, and laser.

16. The non-transitory computer-readable recording medium of claim 8, the instructions further comprising determine a detection accuracy of the second sensor, wherein the determination of the location of the vehicle comprises determining a current location of the vehicle in consideration of the detection accuracy.

17. The non-transitory computer-readable recording medium of claim 16, wherein the detection accuracy is determined based on at least one of a brightness around the second sensor and a number of objects detected through the second sensor.

18. The non-transitory computer-readable recording medium of claim 8, the instructions further comprising, when an object detected through the second sensor has been previously detected, adjust the location of the vehicle based on the relative location between the object and the vehicle at a time of the previous detection.

19. The non-transitory computer-readable recording medium of claim 8, the instructions further comprising:
   determine a reverse path based on a forward driving trajectory of the vehicle;
   when an object behind the vehicle detected through the second sensor during backward driving is not detected during forward driving, determining the location of the object; and
   adjusting the reverse path based on the location of the object not detected during forward driving.

20. The non-transitory computer-readable recording medium of claim 19, the instructions further comprising:
   when the object behind the vehicle is an object not detected during forward driving, detect movement of the object through the second sensor; and
   when the object is moving, determine an expected movement path of the moving object based on the location of the object, wherein:
   the adjustment of the reverse path comprises adjust the reverse path in consideration of the expected movement path of the moving object.

* * * * *